(12) United States Patent
Lee et al.

(10) Patent No.: US 8,929,003 B2
(45) Date of Patent: Jan. 6, 2015

(54) PROJECTION LENS UNIT FOR PICO-PROJECTOR

(71) Applicants: Hee-Joong Lee, Gyeonggi-do (KR); Jin-Ho Kim, Seoul (KR); Sung-Hoon Hwang, Seoul (KR); Seung-Ki Hong, Gyenggi-do (KR)

(72) Inventors: Hee-Joong Lee, Gyeonggi-do (KR); Jin-Ho Kim, Seoul (KR); Sung-Hoon Hwang, Seoul (KR); Seung-Ki Hong, Gyenggi-do (KR)

(73) Assignee: Sekonix Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/106,084

(22) Filed: Dec. 13, 2013

(65) Prior Publication Data

US 2014/0104694 A1    Apr. 17, 2014

Related U.S. Application Data

(62) Division of application No. 13/110,169, filed on May 18, 2011, now Pat. No. 8,693,112.

(51) Int. Cl.
*G02B 9/60* (2006.01)
*G02B 3/00* (2006.01)
*G02B 7/02* (2006.01)
*G02B 13/00* (2006.01)

(52) U.S. Cl.
CPC .............. *G02B 3/0006* (2013.01); *G02B 7/028* (2013.01); *G02B 13/0045* (2013.01)
USPC ......................................... 359/770

(58) Field of Classification Search
CPC ......................................... G02B 9/60
USPC .................................. 359/649, 770
See application file for complete search history.

(56) References Cited

U.S. PATENT DOCUMENTS 6,124,978 A    9/2000  Yoneyama
7,075,622 B2 *  7/2006  Narimatsu ....................... 355/67

FOREIGN PATENT DOCUMENTS

KR    10-2010-0023179    3/2010
KR    10-1005757    12/2010

* cited by examiner

*Primary Examiner* — Joseph P Martinez
(74) *Attorney, Agent, or Firm* — Robert L. Stearns; Dickinson Wright, PLLC

(57) ABSTRACT

A projection lens unit for a pico-projector includes a plurality of plastic lenses and a single glass lens to minimize a change in focal length due to the heat generated inside the pico-projector. The lens array includes:

a $1^{st}$ lens with negative (−) refractive power, a $2^{nd}$ lens with positive (+) refractive power, a $3^{rd}$ lens with negative (−) refractive power, a $4^{th}$ lens with negative (−) refractive power, and a $5^{th}$ lens with positive (+) refractive power, wherein the $1^{st}$ to $5^{th}$ lenses are arranged in order from a screen upon which an image is projected, the $1^{st}$ to $4^{th}$ lenses are plastic lenses and the $5^{th}$ lens is a glass lens.

2 Claims, 2 Drawing Sheets

PROJECTION LENS UNIT FOR PICO-PROJECTOR

CROSS-REFERENCE TO RELATED APPLICATION

This divisional application claims the benefit of U.S. application Ser. No. 13/110,169, filed May 18, 2011 and Korean Patent Application No. 2010-0139206, filed Dec. 30, 2010, the disclosures of which are hereby incorporated herein by reference in their entirety.

BACKGROUND OF THE INVENTION

1. Field of the Invention

The present invention relates to a projection lens for a pico-projector, and more particularly, to a projection lens for a pico-projector in which a plurality of plastic lenses and a single glass lens are arranged, to minimize a change in focal length due to the heat generated inside the pico-projector.

2. Description of the Related Art

As a display device developed and commercialized as a big screen and high resolution display device, a projector has been rising as one of the most important issues. A projector displays an image by projecting the image formed in a display element by using light emitted by a light source.

A very small projector has been developed in the name of a pico-projector. A pico-projector is installed inside or outside of a mobile device, such as a mobile phone, a notebook or a PMP, among others, or a fixed device, such as a desktop computer.

In designing lenses for pico-projectors, it is important to manufacture light lenses at low cost, to satisfy the requirements for less distortion and lateral chromatic aberration and a relatively long back focal length (BFL).

For example, FIG. 1 illustrates a conventional lens unit 100 for a mini projector, the full length of which is about 60 mm. As illustrated in FIG. 1, the lens unit 100 for the mini projector comprises a lens array 10 consisting of seven lenses, a prism 20 for color composition, a cover glass 30 and an image panel 40. The length from a $1^{st}$ lens 11 to a $7^{th}$ lens 17 of the lens array 10 is the full length, and the length from the $7^{th}$ lens 17 (the lens positioned farthest) to the image pane 40 is the back focal length (BFL).

In the case where a plastic lens array is used to reduce the manufacturing cost of a pico-projector and to decrease the weight thereof, the focal length is changed due to the heat generated inside the pico-projector.

SUMMARY OF THE INVENTION

Therefore, it is an object of the present invention to provide a projection lens unit for a pico-projector which is capable of maintaining a stable focal length against the heat generated in the pico-projector.

In accordance with an embodiment of the present invention, there is provided a projection lens unit for a pico-projector which comprises a lens array, a field lens, a cover glass and an image panel, the lens array comprising:
 a $1^{st}$ lens with negative (−) refractive power,
 a $2^{nd}$ lens with positive (+) refractive power,
 a $3^{rd}$ lens with negative (−) refractive power,
 a $4^{th}$ lens with negative (−) refractive power, and
 a $5^{th}$ lens with positive (+) refractive power,
wherein the $1^{st}$ to $5^{th}$ lenses are arranged in order from a screen upon which an image is projected, the $1^{st}$ to $4^{th}$ lenses are plastic lenses and the $5^{th}$ lens is a glass lens.

In accordance with an embodiment of the present invention, there is provided a projection lens unit for a pico-projector which comprises a lens array, a field lens, a cover glass and an image panel, the lens array comprising:
 a $1^{st}$ lens with negative (−) refractive power,
 a $2^{nd}$ lens with positive (+) refractive power,
 a $3^{rd}$ lens with negative (−) refractive power, and
 a $4^{th}$ lens with positive (+) refractive power,
wherein the $1^{st}$ to $4^{th}$ lenses are arranged in order from a screen upon which an image is projected, the $1^{st}$ to $3^{rd}$ lenses are plastic lenses and the $4^{th}$ lens is a glass lens.

BRIEF DESCRIPTION OF THE DRAWINGS

The above and other features and advantages of the present invention will become more apparent to those of ordinary skill in the art by describing in detail a preferred embodiment thereof with reference to the attached drawings in which.

DETAILED DESCRIPTION OF THE PREFERRED EMBODIMENTS

Figure 1:
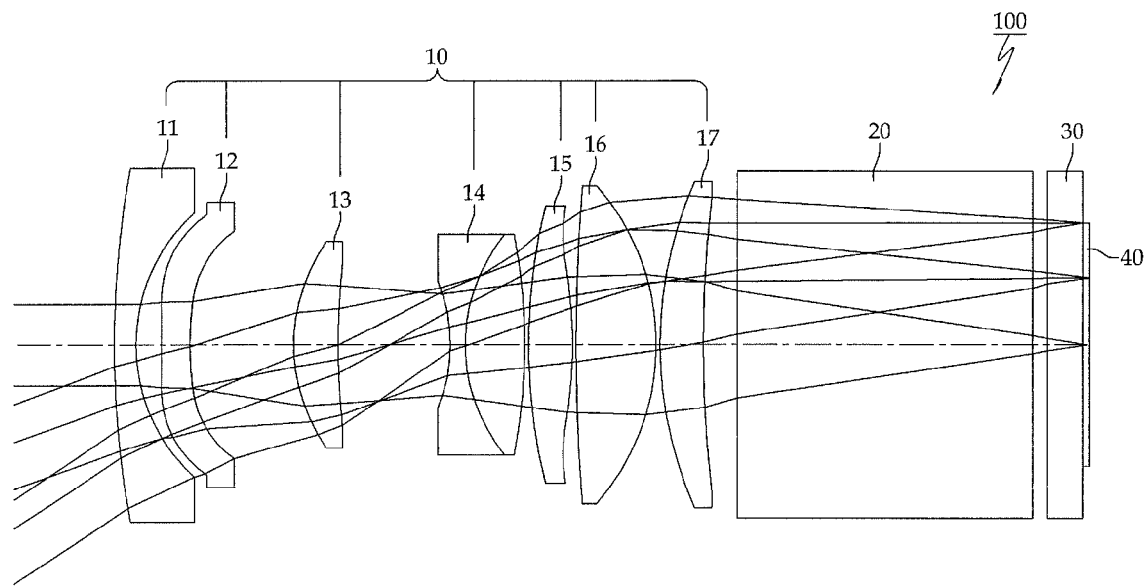
FIG. 1 illustrates a conventional lens unit for a pico-projector.

The present invention will now be described more fully hereinafter with reference to the accompanying drawings, in which preferred embodiments of the invention are shown so that those of ordinary skill in the art can easily carry out the present invention.

In a projection lens unit for a pico-projector according to the present invention, among a lens array including a plurality of plastic lenses and a single glass lens, the plastic lenses are divided into groups. The absolute value of an effective focal length (EFL) of one group is similar to the absolute value of an effective focal length of the other group, and the sign of the value of the effective focal length of one group is opposite to the sign of the value of the effective focal length of the other group (i.e., when the sign of the EFL of one group is positive, the sign of the EFL of the other group is negative, vice versa), thereby preventing the focal lengths of the plastic lenses from being changed by the heat generated inside the pico-projector.

Table 1 shows the focal lengths of $1^{st}$ to $5^{th}$ lenses of a lens array when an internal temperature of a conventional lens unit for a pico-projector is 20° C. The lens array unit having the focal lengths of Table 1 comprises a $1^{st}$ lens L01 with negative (−) refractive power, a $2^{nd}$ lens L02 with positive (+) refractive power, a $3^{rd}$ lens L03 with positive (+) refractive power, a $4^{th}$ lens L04 with negative (−) refractive power and a $5^{th}$ lens L05 with positive (+) refractive power. The $1^{st}$ lens L01 and the $4^{th}$ lens L04 are plastic lenses and the $2^{nd}$ lens L02 and the $3^{rd}$ lens L03 are glass lenses.

TABLE 1

| Lens No. | Side No. | Focus Length |
|---|---|---|
| L01 | S1-S2 | −9.118481 |
| L02 | S3-S4 | 6.908526 |

TABLE 1-continued

| Lens No. | Side No. | Focus Length |
|---|---|---|
| L03 | S5-S6 | 13.708476 |
| L04 | S7-S8 | −4.606706 |
| L05 | S9-S10 | 7.142400 |
| Field Lens | S11-S12 | 13.967408 |

Table 2 shows changes in the focal lengths of the $1^{st}$ to $5^{th}$ lenses L01, L02, L03, L04, L05 of the lens array when the internal temperature of the conventional lens unit for the pico-projector increases to 50° C.

TABLE 2

| Lens No. | Side No. | Focus Length |
|---|---|---|
| L01 | S1-S2 | −9.16957 |
| L02 | S3-S4 | 6.90915 |
| L03 | S5-S6 | 13.711 |
| L04 | S7-S8 | −4.63625 |
| L05 | S9-S10 | 7.14279 |
| Field Lens | S11-S12 | 13.9672 |

When the lenses of the conventional lens array of the lens unit for the pico-projector are divided into two groups, Table 3 shows changes in the composite effective focal length of the $1^{st}$ and $2^{nd}$ lenses L01, L02 and the composite effective focal length of the $3^{rd}$ and $4^{th}$ L03, L04 lenses according to the change of the internal temperature.

TABLE 3

| Lens No | Side No. | Effective Focal length (EFL) | | EFL |
|---|---|---|---|---|
| | | 20° C. | 50° C. | |
| L01, L02 | S1 ... S4 | 14.9712 | 14.8492 | −0.122 |
| L03, L04 | S5 ... S8 | −8.99206 | −9.08769 | −0.09563 |
| | Total | | | −0.21763 |

The back focal length (BFL) between the $5^{th}$ lens L05 and the field lens is 7.10000000000 mm at 20° C. and 6.86190356451757 mm at 50° C. Therefore, the change of the BFL to temperature is about 8 μm/° C. This shows that the change of the BFL caused by the heat is great and thus the extent of deteriorating performance due to the heat is great.

Figure 2:
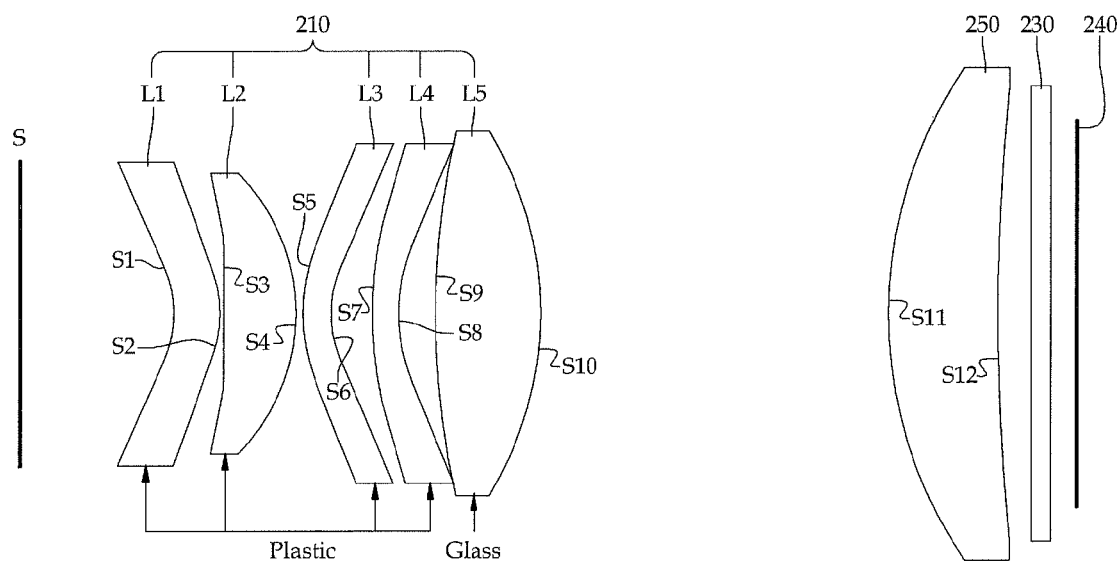
FIG. 2 illustrates a lens array of a lens unit for pico-projector according to a first embodiment of the present invention.

FIG. 2 illustrates a lens array 210 of a lens unit for a pico-projector according to a first embodiment of the present invention.

According to the first embodiment of the present invention, the pico-projector comprises a lens array 210, a field lens 250, a cover glass 230 and an image panel 240. The lens array 210 comprises $1^{st}$ to $5^{th}$ lenses L1, L2, L3, L4, L5 arranged in order from a screen S onto which an image is projected (that is, the $1^{st}$ lens L1 is positioned nearest to the screen S and the $5^{th}$ lens L5 is positioned farthest from the screen S).

The $1^{st}$ lens L1 has negative (−) refractive power, the $2^{nd}$ lens L2 has positive (+) refractive power, the $3^{rd}$ lens L3 has negative (−) refractive power, the $4^{th}$ lens L4 has negative (−) refractive power and the $5^{th}$ lens L5 has positive (+) refractive power. The $1^{st}$ to $4^{th}$ lenses L1, L2, L3, L4 are plastic lenses and the $5^{th}$ lens L5 is a glass lens.

Table 4 shows the focal lengths of the $1^{st}$ to $5^{th}$ lenses L1, L2, L3, L4, L5 of the lens array 210 when the internal temperature of the lens unit for the pico-projector according to the present invention in FIG. 2 is 20° C.

TABLE 4

| Lens No. | Side No. | Focus Length |
|---|---|---|
| L1 | S1-S2 | −19.264410 |
| L2 | S3-S4 | 5.407018 |
| L3 | S5-S6 | −14.612166 |
| L4 | S7-S8 | −6.534655 |
| L5 | S9-S10 | 7.812191 |
| Field Lens 250 | S11-S12 | 13.967517 |

Table 5 shows changes in the focal lengths of the $1^{st}$ to $5^{th}$ lenses L1, L2, L3, L4, L5 of the lens array 210 when the internal temperature of the lens unit for the pico-projector according to the present invention increases to 50° C.

TABLE 5

| Lens No. | Side No. | Focus Length |
|---|---|---|
| L1 | S1-S2 | −19.3516 |
| L2 | S3-S4 | 5.44657 |
| L3 | S5-S6 | −14.7077 |
| L4 | S7-S8 | −6.57616 |
| L5 | S9-S10 | 7.81261 |
| Field Lens 250 | S11-S12 | 13.967517 |

When the plastic lenses in the lens array 210 of the lens unit for the pico-projector according to the present invention are divided into two groups, Table 6 shows changes in the composite effective focal length of the $1^{st}$ and $2^{nd}$ lenses L1, L2 and the composite effective focal length of the $3^{rd}$ and $4^{th}$ lenses L3, L4 according to the change of the internal temperature.

TABLE 6

| Lens No | Side No. | Effective Focal length (EFL) | | EFL |
|---|---|---|---|---|
| | | 20° C. | 50° C. | |
| L1, L2 | S1 ... S4 | 5.71936 | 5.77039 | 0.05103 |
| L3, L4 | S5 ... S8 | −4.44031 | −4.4699 | −0.02959 |
| | Total | | | −0.02144 |

The BFL between the $5^{th}$ lens L5 and the field lens 250 is 7.10000000000 mm at 20° C. and 7.11605148901745 mm at 50° C. Therefore, the change of the BFL to temperature is about 0.52 μm/° C. This shows that the change of the BFL caused by the heat is small and thus the extent of deteriorating performance due to the heat is slight.

Figure 3:
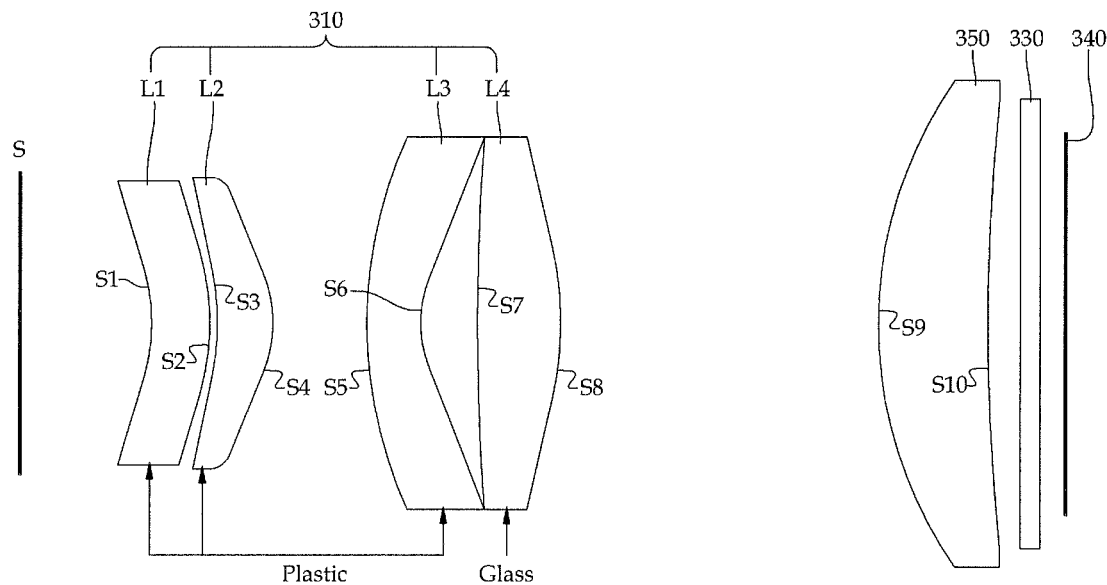
FIG. 3 illustrates a lens array of a lens unit for pico-projector according to a second embodiment of the present invention.

FIG. 3 illustrates a lens array 310 of a lens unit for a pico-projector according to a second embodiment of the present invention.

According to the second embodiment of the present invention, the pico-projector comprises a lens array 310, a field lens 350, a cover glass 330 and an image panel 340. The lens array 310 comprises $1^{st}$ to $4^{th}$ lenses L1, L2, L3, L4 arranged in order from a screen S onto which an image is projected (that is, the $1^{st}$ lens L1 is positioned nearest to the screen S and the $4^{th}$ lens L4 is positioned farthest from the screen S).

The $1^{st}$ lens L1 has negative (−) refractive power, the $2^{nd}$ lens L2 has positive (+) refractive power, the $3^{rd}$ lens L3 has negative (−) refractive power and the $4^{th}$ lens L4 has positive (+) refractive power.

The $1^{st}$ to $3^{rd}$ lenses L1, L2, L3 are plastic lenses and the $4^{th}$ lens L4 is a biconvex glass lens.

Table 7 shows the focal lengths of the $1^{st}$ to $4^{th}$ lenses L1, L2, L3, L4 of the lens array 310 when an internal temperature of the lens unit for the pico-projector according to the present invention in FIG. 3 is 20° C.

TABLE 7

| Lens No. | Side No. | Focus Length |
| --- | --- | --- |
| L1 | S1-S2 | −18.611838 |
| L2 | S3-S4 | 8.053367 |
| L3 | S5-S6 | −9.211764 |
| L4 | S7-S8 | 13.000000 |
| Field Lens 350 | S9-S10 | 21.292183 |

Table 8 shows changes in the focal lengths of the $1^{st}$ to $4^{th}$ lenses L1, L2, L3, L4 of the lens array 310 when the internal temperature of the lens unit for the pico-projector according to the present invention increases to 50° C.

TABLE 8

| Lens No. | Side No. | Focus Length |
| --- | --- | --- |
| L1 | S1-S2 | −18.7213 |
| L2 | S3-S4 | 8.11249 |
| L3 | S5-S6 | −9.26631 |
| L4 | S7-S8 | 13.0011 |
| Field Lens 350 | S9-S10 | 21.2928 |

When the plastic lenses in the lens array 310 of the lens unit for the pica-projector according to the present invention are divided into two groups, Table 9 shows changes in the composite effective focal length of the $1^{st}$ and $2^{nd}$ lenses L1, L2 and the effective focal length of the $3^{rd}$ lens L3 according to the change of the internal temperature.

TABLE 9

| Lens No | Side No. | Effective Focal length (EFL) | | EFL |
| --- | --- | --- | --- | --- |
| | | 20° C. | 50° C. | |
| L1, L2 | S1 . . . S4 | 10.2592 | 10.3529 | 0.0937 |
| L3 | S5-S6 | −9.21176 | −9.26631 | −0.05455 |
| | Total | | | −0.03915 |

The BFL between the $4^{th}$ lens L4 and the field lens 350 is 7.9357877546486 mm at 20° C. and 7.96847819902517 mm at 50° C. Therefore, the change of the BFL to temperature is about 1.63 µm/° C. This shows that the change of the BFL caused by the heat is small and thus the extent of deteriorating performance due to the heat is slight.

Figure 4:
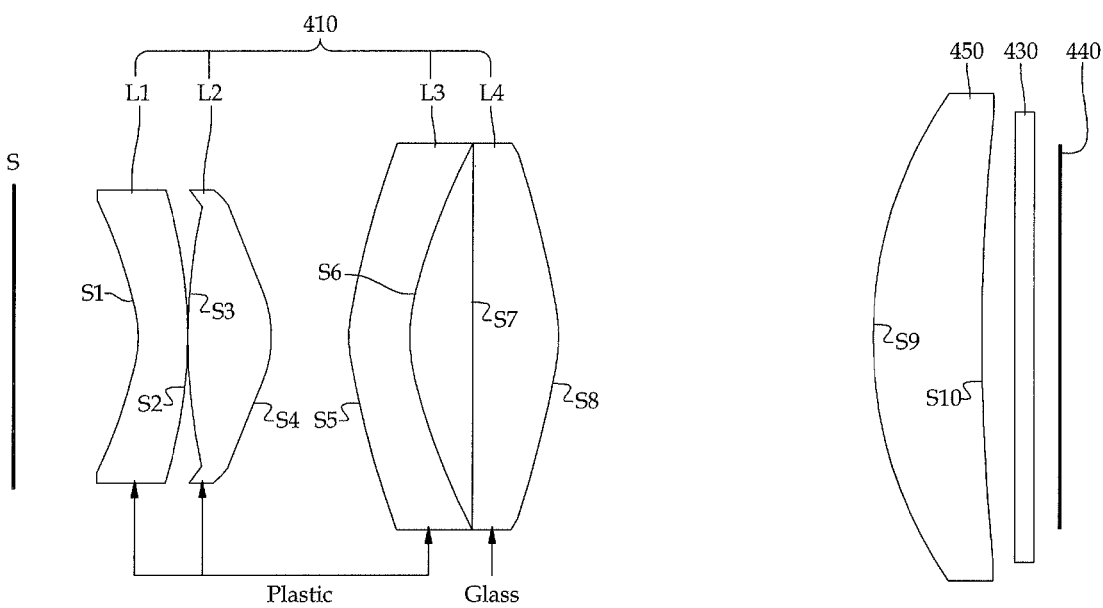
FIG. 4 illustrates a lens array of a lens unit for pico-projector according to a third embodiment of the present invention.

FIG. 4 illustrates a lens array 410 of a lens unit for a pico-projector according to a third embodiment of the present invention.

According to the third embodiment of the present invention, the pica-projector comprises a lens array 410, a field lens 450, a cover glass 430 and an image panel 440. The lens array 410 comprises $1^{st}$ to $4^{th}$ lenses L1, L2, L3, L4 arranged in order from a screen S onto which an image is projected (that is, the $1^{st}$ lens L1 is positioned nearest to the screen S and the $4^{th}$ lens L4 is positioned farthest from the screen S).

The $1^{st}$ lens L1 has negative (−) refractive power, the $2^{nd}$ lens L2 has positive (+) refractive power, the $3^{rd}$ lens L3 has negative (−) refractive power and the $4^{th}$ lens L4 has positive (+) refractive power.

The $1^{st}$ to $3^{rd}$ lenses L1, L2, L3 are plastic lenses and the $4^{th}$ lens L4 is a plano-convex glass lens.

Table 10 shows the focal lengths of the $1^{st}$ to $4^{th}$ lenses L1, L2, L3, L4 of the lens array 410 when an internal temperature of the lens unit for the pico-projector according to the present invention as shown in FIG. 4 is 20° C.

TABLE 10

| Lens No. | Side No. | Focus Length |
| --- | --- | --- |
| L1 | S1-S2 | −14.914166 |
| L2 | S3-S4 | 7.294498 |
| L3 | S5-S6 | −8.907194 |
| L4 | S7-S8 | 12.987345 |
| Field Lens 450 | S9-S10 | 21.292183 |

Table 11 shows changes in the focal lengths of the $1^{st}$ to $4^{th}$ lenses L1, L2, L3, L4 of the lens array 410 when the internal temperature of the lens unit for the pico-projector according to the present invention increases to 50° C.

TABLE 11

| Lens No. | Side No. | Focus Length |
| --- | --- | --- |
| L1 | S1-S2 | −15.0082 |
| L2 | S3-S4 | 7.34753 |
| L3 | S5-S6 | −8.96125 |
| L4 | S7-S8 | 12.988 |
| Field Lens 450 | S9-S10 | 21.2928 |

When the plastic lenses in the lens array 410 of the lens unit for the pico-projector according to the present invention are divided into two groups, Table 12 shows changes in the composite effective focal length of the $1^{st}$ and $2^{nd}$ lenses L1, L2 and the effective focal length of the $3^{rd}$ lens L3 according to the change of the internal temperature.

TABLE 12

| Lens No | Side No. | Effective Focal length (EFL) | | EFL |
| --- | --- | --- | --- | --- |
| | | 20 | 50 | |
| L1, L2 | S1 . . . S4 | 9.88051 | 9.96964 | 0.08913 |
| L3 | S5-S6 | −8.90719 | −8.96125 | −0.05406 |
| | Total | | | −0.03507 |

The BFL between the $4^{th}$ lens L4 and the field lens 450 is 8.05169659897082 mm at 20° C. and 7.96847819902517 mm at 50° C. Therefore, the change of the BFL to temperature is about 1.69 µm/° C. This shows that the change of the BFL caused by the heat is small and thus the extent of deteriorating performance due to the heat is slight.

Therefore, the parts consisting of the plastic lenses among the lens array of the lens unit for the pico-projector according to the present are divided into two groups. The plastic lenses are divided into the two groups so that the absolute value of the effective focal length of one group is similar to the absolute value of the effective focal length of the other group and the sign of the value of the effective focal length of one group is opposite to the sign of the value of the effective focal length of the other group. Accordingly, even though the focal length of each of the plastic lenses is changed by the heat generated inside the pico-projector, the total composite focal length does not change.

As described above, in the projection lens unit for the pico-projector according to the present invention, the total focal length is stably maintained against the heat generated in the internal light source and therefore the image projected upon the screen is clear and constantly clearly maintained.

The invention has been described using a preferred exemplary embodiment. However, it is to be understood that the scope of the invention is not limited to the disclosed embodiment. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A projection lens unit for a pico-projector which comprises a lens array, a field lens, a cover glass and an image panel, the lens array comprising:
    a 1st lens with negative (−) refractive power,
    a 2nd lens with positive (+) refractive power,
    a 3rd lens with negative (−) refractive power,
    a 4th lens with negative (−) refractive power, and
    a 5th lens with positive (+) refractive power,
    wherein the 1st to 5th lenses are arranged in order from a screen upon which an image is projected, the 1st to 4th lenses are plastic lenses and the 5th lens is a glass lens; and including a BFL (back focal length) between the $5^{th}$ lens and the field lens has a change rate of 0.52 μm/° C. in relation to a temperature.

2. The projection lens unit according to claim 1, wherein, when focal lengths of the 1st to 5th lenses are f1, f2, f3, f4 and f5, the 1st to 4th lenses are divided into two groups so that a composite focal length f1-2 of the 1st and 2nd lenses and a composite focal length f3-4 of the 3rd and 4th lenses have the absolute values being similar to each other and the signs of the values being opposite to each other.

* * * * *